United States Patent [19]

Kato et al.

[11] Patent Number: 4,555,657
[45] Date of Patent: Nov. 26, 1985

[54] VOLTAGE REGULATOR FOR ALTERNATOR OF VEHICLE

[75] Inventors: Hidetoshi Kato, Anjo; Toshinori Maruyama; Hajime Matsuhashi, both of Kariya; Yoshio Akita, Chiryu, all of Japan

[73] Assignee: Nippondenso Co., Ltd., Kariya, Japan

[21] Appl. No.: 557,529

[22] Filed: Dec. 2, 1983

[30] Foreign Application Priority Data

Dec. 6, 1982 [JP] Japan ............................... 57-213497

[51] Int. Cl.$^4$ ........................... H02J 7/14; H02P 9/04
[52] U.S. Cl. ........................................ 320/64; 322/28; 322/73
[58] Field of Search ..................... 322/28, 29, 32, 58, 322/73; 320/64, 68

[56] References Cited

U.S. PATENT DOCUMENTS 3,491,285 1/1970 Nowakowski ................. 322/73 X
4,128,799 12/1978 Morishima ....................... 322/28
4,384,245 5/1983 Metter ............................. 322/28

Primary Examiner—R. J. Hickey
Attorney, Agent, or Firm—Cushman, Darby & Cushman

[57] ABSTRACT

A voltage regulator for controlling electric power generated by an alternator coupled to a vehicle engine is disclosed. The regulator comprises a switching circuit for regulating an output voltage from the alternator or a voltage for charging the battery of the vehicle to a predetermined value by controlling a current flowing through the rotor coil of the alternator, a comparator for detecting ON-state of the switching circuit, a smoothing circuit for detecting the average ON duty of the switching circuit by smoothing the output of the comparator, and a reference-voltage generating circuit for generating and issuing a reference voltage in response to the average ON duty to the switching circuit. The voltage regulator detects the load condition of the alternator from the average ON duty of the switching circuit and regulates the output voltage of the alternator or the voltage for charging the battery of the vehicle in accordance with the load condition to charge the battery in proper condition.

3 Claims, 4 Drawing Figures

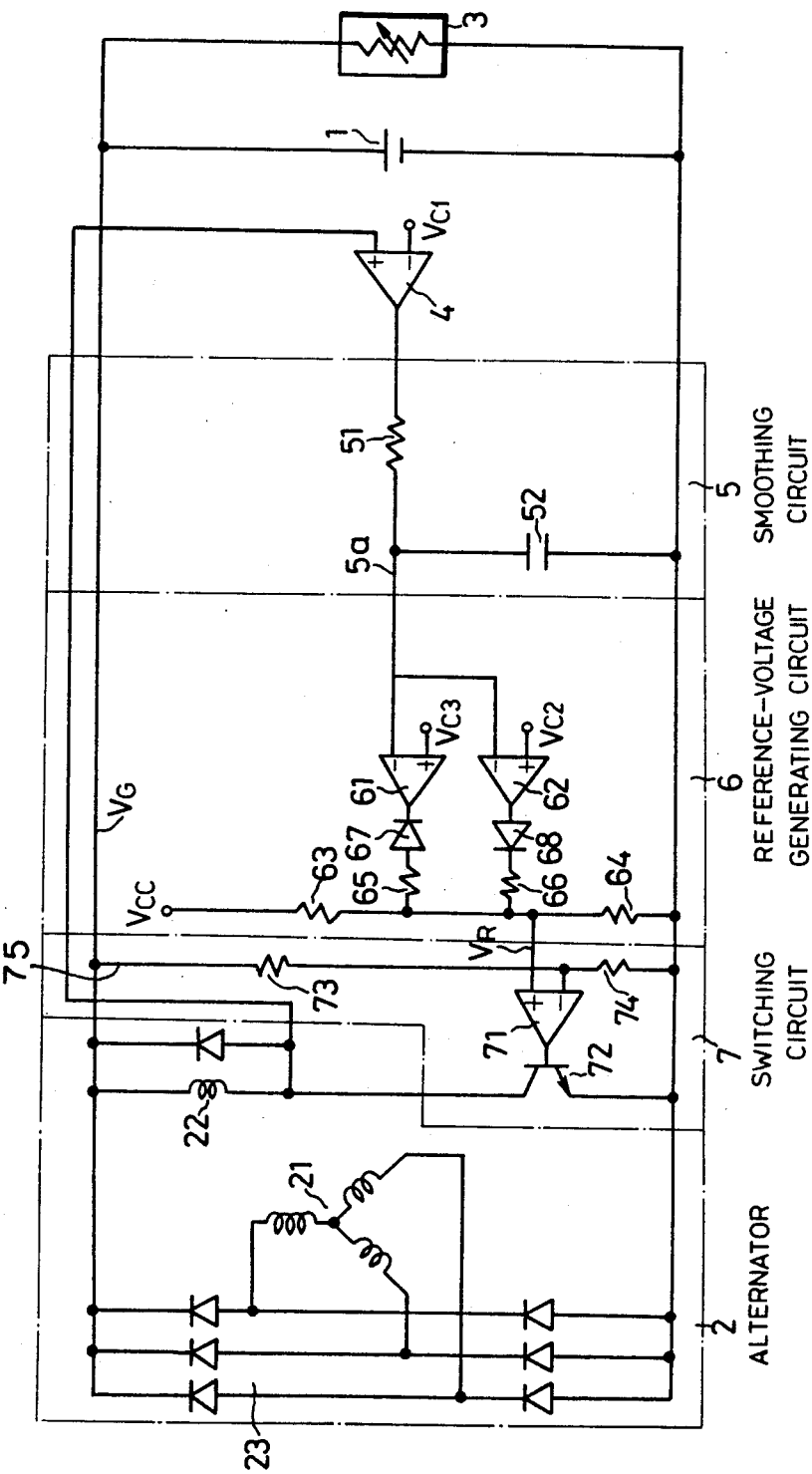

VOLTAGE REGULATOR FOR ALTERNATOR OF VEHICLE

BACKGROUND OF THE INVENTION

The present invention relates to a voltage regulator for controlling electric power generated by an alternator coupled to a vehicle engine to maintain a battery charging voltage at a constant level.

Voltage regulators of the type described have a switching means for turning on and off a current flowing through the rotor coil of an alternator to control electric power generated thereby. More specifically, the voltage regulator controls electric power generated by the alternator dependent on an increase or reduction in the electric load coupling to the alternator to increase or reduce an output current therefrom in order to maintain a constant voltage for charging a battery.

Voltage regulators include battery-sensing type voltage regulators and alternator-sensing type voltage regulators. The battery-sensing type voltage regulator directly senses a battery charging voltage for keeping the latter at a constant level. The alternator-sensing type voltage regulator maintains an output voltage from the alternator at a level slightly higher than a battery charging voltage, taking into account a voltage drop across a charging output line, and is simpler in arrangement than the battery-sensing type voltage regulator.

The recent trend in automotive technology is toward much more electric parts equipped in automobiles, and hence the alternator on automobiles is subjected to a greatly varying electric load dependent on the manner in which the electric parts are used. Therefore, the voltage regulator is required to vary the output current from the alternator to a large extent dependent on the electric load so as to keep the battery charging voltage constant. While the alternator-sensing type voltage regulator allows a constant output voltage from the alternator, it produces a large variation in the voltage drop across the charging output line, with the result that an actual battery charging voltage will vary beyond an allowable level, thus charging or discharging the battery excessively.

The battery-sensing type voltage regulator does not suffer from any variation in the battery charging voltage due to a voltage drop across the charging output line since the voltage regulator directly senses the battery charging voltage. However, with a battery charging voltage preset for a normal load condition, the battery tends to be charged or discharged excessively when a large electric load is used for a long period of time while the vehicle is running at low speed or when only a small electric load is used for a long period of time while the vehicle is travelling at high speed.

SUMMARY OF THE INVENTION

It is an object of the present invention to provide a voltage regulator for use with an alternator for charging a battery in proper condition.

Another object of the present invention is to provide an alternator-sensing voltage regulator for varying an output voltage from an alternator dependent on a load condition thereof to thereby compensate for a voltage drop across a charging output line for keeping a battery charging voltage at a constant level.

Still another object of the present invention is to provide a battery-sensing voltage regulator for properly varying a battery charging voltage dependent on load condition of an alternator.

According to the present invention, a voltage regulator for an alternator of a vehicle comprises switching means for controlling a current flowing through the rotor coil of the alternator to regulate an output voltage from the alternator or a voltage for charging the battery of the vehicle to a predetermined value, means for detecting an average conduction rate of the switching means and generating an output signal indicative of the detected average conduction rate, and means responsive to the output signal from the detecting means for generating and issuing a reference voltage by steps to the switching means, which determines the predetermined value of the voltage to be regulated by said switching means.

The load condition of the alternator is derived from the average conduction rate of the switching means, and the value of a reference voltage to be applied to the switching means is varied dependent on the load condition.

With the foregoing arrangement, an alternator-sensing type voltage regulator is capable of preventing a variation in the battery charging voltage to thereby charge the battery in proper condition.

A battery-sensing type voltage regulator is also capable of charging the battery in proper condition by properly changing the battery charging voltage.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 1 is a circuit diagram of a voltage regulator according to an embodiment of the present invention;

DESCRIPTION OF THE PREFERRED EMBODIMENTS

Figure 2A:
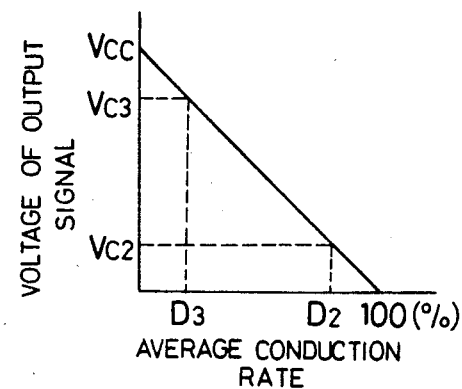
FIGS. 2A and 2B are diagrams showing an output signal voltage from a smoothing circuit and a reference voltage in the voltage regulator shown in FIG. 1 respectively as they vary with respect to the average conduction rate of a switching transistor in the voltage regulator.

As shown in FIG. 1, a battery 1 and an electric load 3 are connected in parallel to an alternator 2, the electric load 3 symbolizing various electric parts on an automotive vehicle. A voltage regulator of the present invention comprises a comparator 4 for detecting the ON-state of a switching circuit 7 (described later), a smoothing circuit 5 serving as a conduction rate detecting means for issuing an output $5a$ indicative of an average ON duty D of the switching means, a reference-voltage generating circuit 6, and a switching circuit 7.

The alternator 2 is composed of a 3-phase stator coil 21 and a rotor (field) coil 22. The stator coil 21 induces an AC voltage thereacross when the rotor coil 22 is excited. The AC voltage generated by the stator coil 21 is rectified by a rectifier device 23.

The switching circuit 7 comprises a comparator 71, a switching transistor 72, and a pair of series-connected resistors 73, 74 which are connected to an output terminal of the alternator 2 by a sensing line 75 acting as a sensing means. The comparator 71 compares an output voltage $V_R$ from the reference-voltage generating circuit 6 with a feedback voltage appearing between the resistors 73, 74 and derived from a voltage $V_G$ generated by the alternator 2. Based on the result of voltage comparison, the comparator 71 turns on or off the transistor 72 for switching on or off a current flowing through the rotor coil 22 to thereby keep the voltage $V_G$ generated by the alternator 2 at a constant level $(R_1+R_2)\cdot V_R/R_2$ ($R_1$, $R_2$ are resistances of the resistors 73, 74, respectively). More specifically, when the feedback voltage is greater than the reference voltage $V_R$, the transistor 72 is turned off to de-energize the rotor coil 22 of the alternator 2 for reducing the voltage generated by the alternator 2. Conversely, when the feedback voltage is lower than the regulated voltage $V_R$, the transistor 72 is rendered conductive to energize the rotor coil 22 of the alternator 2 for increasing the voltage generated thereby.

The comparator 4 has a non-inverting input terminal connected to the collector of the transistor 72. The collector voltage of the transistor 72 is therefore compared with a constant voltage $V_{C1}$ applied to an inverting input terminal of the comparator 4. When the transistor 72 is turned on, its collector voltage is low, and the comparator 4 produces an output of "0" state (0 V). When the transistor 72 is turned off, the collector voltage is high and the comparator 4 issues an output of "1" state ($V_{CC}$).

The smoothing circuit 5 is composed of a resistor 51 and a capacitor 52 for smoothing the output from the comparator 4 which varies in state. The smoothing circuit 5 produces a signal 5a with its voltage lowered in inverse proportion to an average ON duty D of the transistor 72 as shown in FIG. 2A.

The reference voltage generating circuit 6 comprises comparators 61, 62, resistors 63, 64, 65, 66, and diodes 67, 68. The comparators 61, 62 have non-inverting input terminals to which are respectively applied constant voltages $V_{C2}$, $V_{C3}$ (for example, corresponding respectively to average conduction rates $D_2 \approx 80\%$, $D_3 \approx 20\%$ in FIGS. 2A and 2B), the constant voltage $V_{C3}$ being higher than the constant voltage $V_{C2}$. The resistors 63, 64 are connected in series between a power supply $V_{CC}$ and ground.

Figure 2B:
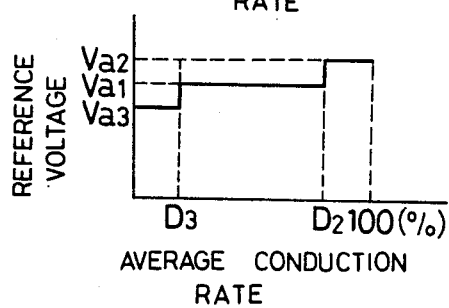

While the voltage of the output signal 5a from the smoothing circuit 5 is of the level between the voltages $V_{C2}$, $V_{C3}$, the comparator 61 issues an output of "1" state or the voltage $V_{CC}$ and the comparator 62 issues an output of "0" state or the voltage 0 V. Under this condition, the diodes 67, 68 are rendered non-conductive, and the reference voltage $V_R$ applied to the switching circuit 7 is equal to a voltage $V_{a1}$ (first reference voltage), as shown in FIG. 2B, which is produced by dividing the power supply voltage $V_{CC}$ with the resistors 63, 64. When the voltage of the output signal 5a is lower than the voltage $V_{C2}$, the comparator 62 issues an output of "1" state, whereupon the resistor 66 is connected parallel to the resistor 63, and the reference voltage $V_R$ is increased to a voltage $V_{a2}$ (second reference voltage). When the voltage of the output signal 5a is higher than the voltage $V_{C3}$, the comparator 61 issues an output of "0" state. The resistor 65 is now connected parallel to the resistor 64 to lower the reference voltage $V_R$ down to a voltage $V_{a3}$ (third reference voltage).

Operation of the voltage regulator of the foregoing construction is as follows:

When the battery 1 is discharged as a current flows through the load 3 and the output voltage $V_G$ of the alternator 2 is lowered, the comparator 71 in the switching circuit 7 produces an output of "1" state to energize the transistor 72. The rotor coil 22 of the alternator 2 is now excited to enable an output current from the alternator 2 to charge the battery 1. When the output voltage $V_G$ is restored by the battery charging, the transistor 72 is turned off, and no current is then supplied from the alternator 2 to the battery 1.

Under a normal load condition, the frequency at which the battery 1 is charged by the energization of the transistor 72, that is, the average ON duty D of the transistor 72 is kept in a predetermined range (D=20 through 80% in the illustrated embodiment). The voltage of the output signal 5a from the smoothing circuit 5 is held between the constant voltages $V_{C2}$, $V_{C3}$ in the reference-voltage generating circuit 6. Thus, the reference voltage $V_R$ produced by the generating circuit 6 is equal to the first reference voltage $V_{a1}$ which is derived from dividing the power supply voltage $V_{CC}$ with the resistors 63, 64. The output voltage $V_G$ from the alternator 2 while the battery 1 is being charged thereby is regulated into a value taking into account a voltage drop due to a normal load current for thereby charging the battery 1 in proper condition.

As the load 3 is increased, the frequency of charging of the battery 1 is increased, and the conduction rate of the transistor 72 is increased. The voltage of the output signal 5a from the smoothing circuit 5 is lowered below the constant voltage $V_{C2}$ in the reference-voltage generating circuit 6, whereupon the comparator 62 produces an output of "0" state to increase the regulated voltage $V_R$ up to the second reference voltage $V_{a2}$. The output voltage $V_G$ from the alternator 2 is regulated into a higher value taking into account an increased voltage drop due to a large load current for thereby charging the battery 1 in proper condition.

When the load 3 is reduced, the conduction rate of the transistor 72 is lowered to reduce the reference voltage $V_R$ down to the third reference voltage $V_{a3}$. The voltage $V_G$ generated by the alternator 2 is regulated into a lower value to charge the battery 1 under proper condition.

With the voltage regulator according to the present invention, any variation in the output current from the alternator is detected from the average ON duty of the switching transistor 72 to regulate the output voltage from the alternator to compensate for a voltage drop across the charging output line, thus charging the battery in proper condition.

While in the foregoing embodiment of the alternator-sensing type voltage regulator for keeping the output voltage from the alternator at a constant level has been described, the same arrangement is equally applicable to a battery-sensing voltage regulator which directly senses the battery voltage by means of the sensing line 75 to keep the latter constant. In such an application, the time constant of the smoothing circuit 5 is selected to be relatively long (in minutes, for example) as compared with the time constant (in seconds, for example) of the smoothing circuit 5 in the foregoing illustrated embodiment, for increasing the average time interval of the ON duty of the transistor 72. The average ON duty at this time is well indicative of any excessive charging or discharging of the battery which is brought about by certain electric load conditions or vehicle running conditions. Although in the illustrated embodiment the regulated voltage is variable in three stages, it may be variable in more stages.

Figure 3:
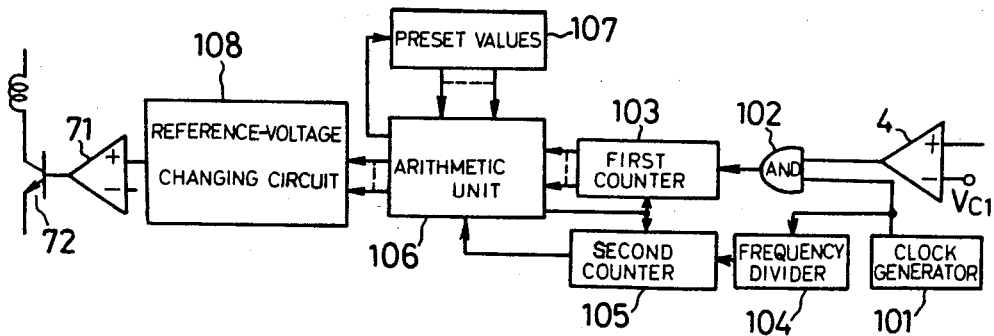
FIG. 3 is a circuit diagram of a voltage regulator according to another embodiment of the present invention.

The average conduction rate of the transistor 72, which is detected by the analog circuit arrangement as shown, may be detected by a digital circuit arrangement. FIG. 3 shows such a digital circuit arrangement for finding a ratio of a nonconduction time interval to a prescribed time interval which has elapsed, and comparing the ratio with various preset values to change the regulated voltage for the regulator. The circuit arrangement illustrated in FIG. 3 corresponds to a portion of that shown in FIG. 1, and comprises a clock generator 101, and AND gate 102, a first counter 103 for adding nonconduction time intervals of the transistor 72, a frequency divider 104, a second counter 105 for issuing a signal each time a prescribed time interval elapses, a comparator and arithmetic unit 106 for comparing the count from the first counter 103 with various preset values 107 each time a prescribed time interval elapses, indicating which preset range the current average conduction rate falls in, and immediately thereafter resetting the first and second counters 103, 105, and a reference voltage changing circuit 108 for changing the reference voltage in response to a command from the comparator and arithmetic unit 106. The arrangement shown in FIG. 3 is as advantageous as the voltage regulator illustrated in FIG. 1.

Where the embodiment in FIG. 3 is applied to a battery-sensing type voltage regulator, the prescribed time interval may be a long time interval such as one week, and the reference voltage for the alternator may be changed dependent on the average conduction rate in that time interval.

Although a certain preferred embodiment has been shown and described, it should be understood that many changes and modifications may be made therein without departing from the scope of the appended claims.

What is claimed is:

1. A voltage regulator for an alternator of a vehicle, having a rotor coil for charging a battery of the vehicle in proper condition, comprising:
   (a) switching means for controlling a current flowing through the rotor coil of the alternator to regulate an output voltage from the alternator or a voltage for charging the battery to a predetermined value;
   (b) means for detecting an average conduction rate of said switching means and generating an output signal indicative of said detected average conduction rate; and
   (c) means responsive to the output signal from said detecting means for generating and issuing a reference voltage to said switching means, which determines the predetermined value of the voltage to be regulated by said switching means;
   said switching means comprising a switching transistor connected in series with the rotor coil of the alternator and said detecting means comprising a comparator for generating an output signal of "0" state or "1" state when said switching transistor is rendered conductive and an output signal of "1" state or "0" state when said switching transistor is rendered nonconductive through detection of a collector-to-emitter voltage of said switching transistor.

2. A voltage regulator according to claim 1, wherein said detecting means comprises a smoothing circuit for smoothing an output signal from said comparator and issuing an output indicative of the average conduction rate.

3. A voltage regulator according to claim 1, wherein said detecting means comprises a counter for counting clock pulses when the output of said comparator is of any one of the states, said counter being resettable at each prescribed interval of time for issuing a digital value of the average conduction rate in each interval of time.

* * * * *